United States Patent
Zuraski et al.

(10) Patent No.: US 9,286,073 B2
(45) Date of Patent: Mar. 15, 2016

(54) READ-AFTER-WRITE HAZARD PREDICTOR EMPLOYING CONFIDENCE AND SAMPLING

(71) Applicant: SAMSUNG ELECTRONICS CO., LTD., Suwon-si (KR)

(72) Inventors: Gerald Zuraski, Austin, TX (US); Paul Kitchin, Austin, TX (US); Brian Grayson, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/553,055

(22) Filed: Nov. 25, 2014

(65) Prior Publication Data

US 2015/0193334 A1    Jul. 9, 2015

Related U.S. Application Data

(60) Provisional application No. 61/924,371, filed on Jan. 7, 2014.

(51) Int. Cl.
*G06F 12/00* (2006.01)
*G06F 9/38* (2006.01)
*G06F 12/08* (2006.01)

(52) U.S. Cl.
CPC .............. *G06F 9/38* (2013.01); *G06F 12/0831* (2013.01); *G06F 12/0875* (2013.01)

(58) Field of Classification Search
None
See application file for complete search history.

(56) References Cited

U.S. PATENT DOCUMENTS

| | | | |
|---|---|---|---|
| 6,189,068 B1 * | 2/2001 | Witt | G06F 9/3004 711/118 |
| 2003/0033510 A1 * | 2/2003 | Dice | G06F 9/383 712/235 |

* cited by examiner

*Primary Examiner* — Brian Peugh
(74) *Attorney, Agent, or Firm* — Sughrue Mion, PLLC

(57) ABSTRACT

Dynamically predicting a Read-After-Write (RAW) hazard by employing a variable confidence score attributed to a RAW Resynchronization Predictor (RRP) for sampling the RRP at timing periods dynamically adjusted based on the confidence score to optimize prediction of the RAW hazard.

20 Claims, 4 Drawing Sheets

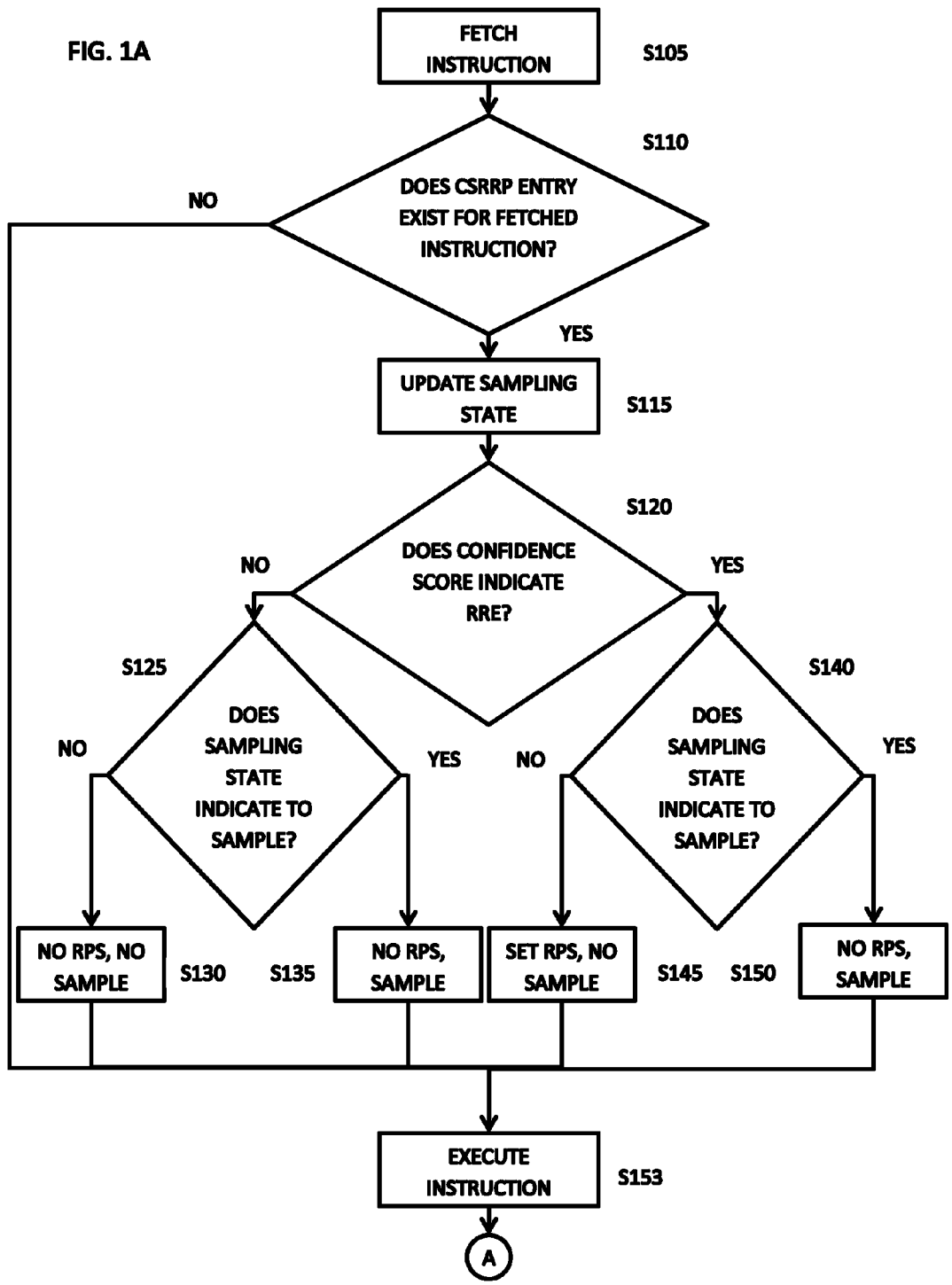

FIG. 2A

| Confidence State | Sampling Period |
|---|---|
| 7 | 4096 |
| 6 | 1024 |
| 5 | 256 |
| 4 | 64 |
| 3 | 16 |
| 2 | 4 |
| 1 | 1 |
| 0 | 1 |
| -1 | 1 |
| -2 | 1 |
| -3 | 1 |
| -4 | 1 |
| -5 | 1 |
| -6 | 1 |

FIG. 2B

| Confidence State | Sampling Period |
|---|---|
| 7 | 4096 |
| 6 | 1024 |
| 5 | 256 |
| 4 | 64 |
| 3 | 16 |
| 2 | 4 |
| 1 | 1 |
| 0 | 1 |
| -1 | 1 |
| -2 | 4 |
| -3 | 16 |
| -4 | 64 |
| -5 | 256 |
| -6 | 1024 |

READ-AFTER-WRITE HAZARD PREDICTOR EMPLOYING CONFIDENCE AND SAMPLING

CROSS-REFERENCE TO RELATED PATENT APPLICATION

This application claims the benefit of U.S. Provisional Application No. 61/924,371, filed on Jan. 7, 2014, in the United States Patent and Trademark Office, the disclosure of which is incorporated herein by reference in its entirety.

BACKGROUND

1. Field

Methods and apparatuses consistent with exemplary embodiments relate to predicting a Read-After-Write (RAW) hazard, and more particularly, to a method and apparatus for dynamically sampling a RAW predictor to optimize prediction of the RAW hazard.

2. Description of Related Art

Processors commonly rely on performing load and store instructions out of order to achieve higher performance. When a younger load instruction to an address in memory is executed before an older store instruction to that same address in memory, and the store data was not correctly forwarded to the load, then this is known as a Read-After-Write (RAW) hazard in which the load instruction employs bad load data. When the RAW hazard occurs, processors typically need to repair the bad load data by performing a costly RAW resynchronization exception (RRE), in which all in-flight instructions younger than the store instruction are flushed and fetch restarts are performed for the instructions following the store instruction. This event is costly due to the extra core clocks required to flush ops and re-fetch the instructions. This is known as the RRE penalty.

To avoid a costly RRE, processors can employ a RAW Resynchronization Predictor (RRP) that can train on previous RREs, based on the address of the store instruction, and avoid these RRE in the future. When the RRP is trained and detects a store instruction address that has been shown to cause an RRE, the RRP can send an indication to block any younger load instructions from executing ahead of the resynchronization predicted store (RPS) instruction. Without a younger load instruction executing ahead of the RPS, no RRE can occur, which avoids the RRE penalty. The younger load instructions are only unblocked once execution of the RPS is completed.

Frequently, there are multiple younger load instructions that can be blocked by an RPS and only one of those load instructions is to the same memory address of the RPS. This is the critical load instruction that needs to be blocked to avoid the RRE penalty, but all other Non-Critical Loads (NCL) are also blocked by the RPS. When an RPS blocks NCLs, there is lost performance due to those NCLs having to wait to execute. This is known as the NCL penalty. Typically the performance gain of avoiding the RRE penalty is greater than the performance loss of the blocked NCLs, making the RRP worthwhile.

However, when instruction code is repeated in a loop, the execution behavior may differ slightly for each iteration. If no RRP was employed, it is possible that on the first iteration of the instruction code, an RRE may occur, but on all subsequent iterations of the instruction code an RRE would not have occurred. Therefore the RRE penalty with no RRP would have been very small because RRE would have occurred only once. Nonetheless, if an RRP was used in this scenario, then the RRP would train on the first RRE and avoid all subsequent RREs to that same store even if no further RREs would have actually occurred. Therefore, while there is actually no significant RRE penalty for the RRP to avoid, the RRP is still causing an NCL penalty. In this case, the RRP negatively affects performance.

SUMMARY

Exemplary embodiments may overcome the above disadvantages. However, an exemplary embodiment is not required to overcome the above disadvantages.

According to an aspect of an exemplary embodiment, there is provided a processor including a Confidence/Sampling Read-After-Write Resynchronization Predictor (CSRRP) configured to receive an address of an instruction to be executed, store a CSRRP entry comprising the address of the instruction and a confidence score that indicates whether executing the instruction as a resynchronization predicted store (RPS) will avoid a Read-After-Write (RAW) resynchronization exception (RRE) penalty, and determine whether to execute the instruction as the RPS based on the confidence score.

According to an aspect of an exemplary embodiment, there is provided a method of predicting whether execution of an instruction as a resynchronization predicted store (RPS) by a processor will avoid a Read-After-Write (RAW) resynchronization exception (RRE) penalty, the method including receiving an address of an instruction to be executed, storing a CSRRP entry comprising the address of the instruction and a confidence score that indicates whether executing the instruction as the RPS will avoid the RRE penalty, and determining whether to execute the instruction as the RPS based on the confidence score.

BRIEF DESCRIPTION OF THE DRAWINGS

The above and/or other aspects will become more apparent by describing in detail exemplary embodiments with reference to the attached drawings in which:

FIGS. 1A-B illustrate a flowchart of a method of dynamically sampling a RAW predictor to optimize prediction of the RAW hazard, according to an exemplary embodiment.

FIG. 2A illustrates a table describing confidence states of a CSRRP entry and associated sampling periods, according to an exemplary embodiment.

FIG. 2B illustrates a table describing confidence states of a CSRRP entry and associated sampling periods, according to an exemplary embodiment.

DETAILED DESCRIPTION OF EXEMPLARY EMBODIMENTS

Figure 1B:
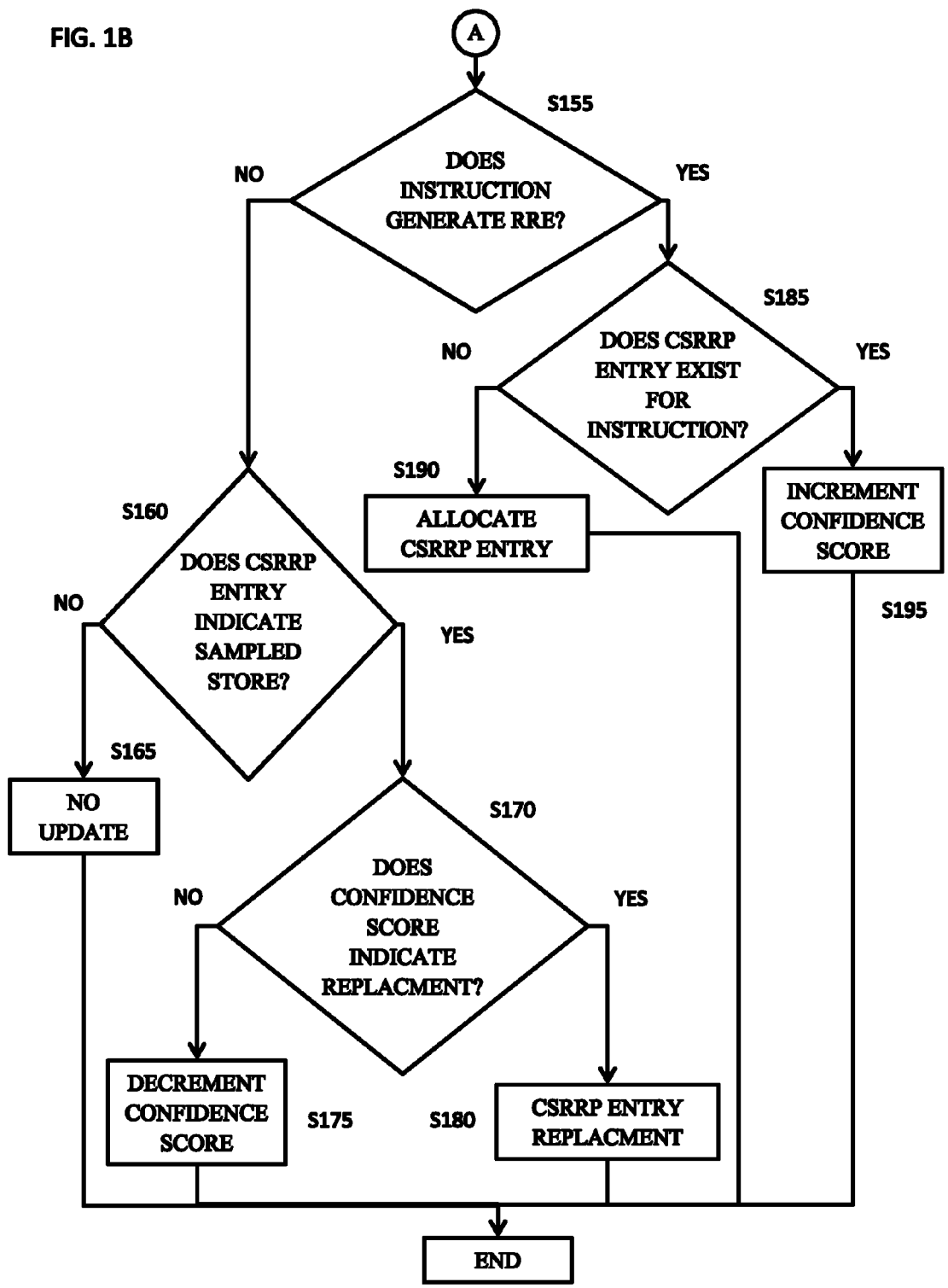

Exemplary embodiments will now be described more fully with reference to the accompanying drawings, in which like reference numerals refer to like elements throughout. Expressions such as "at least one of," when preceding a list of elements, modify the entire list of elements and do not modify the individual elements of the list.

FIGS. 1A-B illustrate a flowchart of a method of dynamically sampling a RAW predictor to optimize prediction of the RAW hazard, according to an exemplary embodiment.

Before discussion of the method of dynamically sampling a RAW predictor to optimize prediction of the RAW hazard, certain aspects of the optimized prediction of the RAW hazard will be discussed to provide a thorough understanding of the optimized prediction of the RAW hazard.

According to an aspect of an exemplary embodiment, a Confidence/Sampling RRP (CSRRP) may be used to avoid training (i.e., setting) the RRP to predict that an RRE will occur for an instruction that is, in fact, unlikely to generate an RRE. Specifically, by combining the use of a confidence score and a sampling technique to RRP entries, the CSRRP may avoid predicting that an instruction will generate an RRE, and thus treating the instruction as an RPS, when that instruction is actually unlikely to generate an RRE and should not be treated as an RPS.

First, with respect to the confidence score, when an executed instruction generates an RRE for data to be stored at a memory address, the CSRRP allocates a CSRRP entry indicating the memory address of the instruction generating the RRE and a confidence score. The CSRRP entries may be stored in memory through use of a CSRRP entry table, for example. The CSRRP entry may also indicate a sampling state or sampling counter, which corresponds to a period or frequency with which the address indicated by CSRRP entry may be sampled, as will be discussed below.

The confidence score indicates a likelihood that the CSRRP entry, which identifies the memory address of the instruction generating an RRE, will accurately predict that the instruction stored at the associated memory address will generate the RRE if the instruction is executed.

For example, a CSRRP entry having a high confidence score indicates a high likelihood that the CSRRP entry will accurately predict that the instruction stored at the associated memory address will generate the RRE if the instruction is executed, and therefore there is a correspondingly high likelihood that setting the instruction as an RPS will avoid an RRE.

On the other hand, a CSRRP having a low confidence score indicates a low likelihood that the CSRRP entry will accurately predict that the instruction stored at the associated memory address will generate the RRE if the instruction is executed, and therefore there is a correspondingly low likelihood that setting the instruction as an RPS will avoid RRE.

After a CSRRP entry has been allocated for a memory address, when a memory address of a fetched instruction matches the CSRRP entry, the confidence score of the matched CSRRP entry is compared to a confidence threshold. If the confidence score of the CSRRP entry exceeds the confidence threshold, the CSRRP may determine that the fetched instruction is an RPS. If the confidence score of the CSRRP entry does not exceed the threshold, the CSRRP may determine that the fetched instruction is not an RPS.

As discussed above, a confidence score may be used to determine whether a fetched instruction should be treated as an RPS. However, because an instruction handled as an RPS can never cause an RRE, due to blocking the execution of younger instructions until execution of the RPS is completed, it cannot be determined whether treating the instruction as an RPS is helpful in avoiding an RRE. That is to say, as discussed above, in an example of instruction code iteratively repeated in a loop, RRP may or may not provide processing efficiencies.

Accordingly, a second aspect of the CSRRP is to perform sampling, in combination with the confidence score. The sampling scheme periodically samples CSRRP entries, even if the entry's confidence score is below the confidence threshold, thereby indicating that the sampled entry would not trigger RPS processing for an instruction.

If the instruction stored at the memory address of the sampled CSRRP entry causes an RRE, then the CSRRP increases the confidence score of the sampled CSRRP entry. If the instruction stored at the memory address of the sampled CSRRP entry does not cause an RRE, the CSRRP decreases the confidence score of the sampled CSRRP entry.

To maintain efficiency of the CSRRP, the CSRRP may determine whether the confidence score of a sampled CSRRP entry is at or below a replacement threshold. If the CSRRP determines that the confidence score of the sampled CSRRP entry has reached the replacement threshold, the CSRRP may deallocate the sampled CSRRP entry. Accordingly, other memory addresses of instructions, which may possibly generate an RRE, may be allocated as CSRRP entries. As a result, through the culling of CSRRP entries, those CSRRP entries having the highest likelihood of instructions generating an RRE may be maintained while CSRRP entries having a low likelihood of instructions generating an RRE may be released.

The sampling technique may dynamically sample each CSRRP entry based on the confidence score of each CSRRP entry.

Those CSRRP entries having high confidence scores may be sampled less frequently. This is because there is higher likelihood that the instruction of the sampled CSRRP entry will cause an RRE, and therefore the processor may be subjected to an RRE penalty when performing sampling of such CSRRP entries.

On the other hand, CSRRP entries having lower confidence scores may be sampled more frequently. This is because there is a lower likelihood that the instruction of the sampled CSRRP entry will cause an RRE, and therefore the processor is less likely to be subjected to an RRE penalty when performing sampling of such CSRRP entries.

Further, CSRRP entries having lower confidence scores may be sampled more frequently also because undesirable CSRRP entries should be deallocated as soon as possible, to free up CSRRP entry space for unvisited potentially RRE-generating instruction code. Thereby, those CSRRP entries having the highest likelihood of generating an RRE may be maintained while CSRRP entries having a low likelihood of generating an RRE may be released.

Turning now to the flowchart of FIGS. 1A-B, the optimized prediction of the RAW illustrates use of the confidence and sampling logic to better predict and avoid RRE, and thus correspondingly avoiding the penalties associated with RRE.

In step S105, a fetch unit of a processor may fetch a store instruction from memory, based on the memory address of the store instruction. The fetch unit may transmit the fetched store instruction to the CSRRP of the processor.

In step S110, the CSRRP may determine whether the memory address of the fetched store instruction matches a memory address of an existing CSRRP entry. If the memory address of the fetched store instruction does not match a memory address of an existing CSRRP entry (step S110-NO), the RRP check is complete and the fetched store instruction may be executed by the processor in step S153. Because the fetched store instruction does not match an existing CSRRP entry, the fetched store instruction is executed without any RPS indication.

If the memory address of the fetched store instruction matches an existing CSRRP entry (step S110-YES), the CSRRP may update a sampling state of the CSRRP entry in step S115.

According to an exemplary embodiment, the sampling state may be updated by decrementing a sampling counter associated with the CSRRP entry. Alternatively, the sampling state may be updated by incrementing a sampling counter associated with the CSRRP entry.

When the sampling counter reaches a sampling threshold, which may be either a maximum threshold value if incrementing the sampling counter or a minimum threshold value if decrementing the sampling counter, then the CSRRP entry may be sampled, as will be discussed below. For the purposes of explanation, it will be presumed that the sampling counter is decremented in step S115.

Once the sampling state of the CSRRP entry is updated, the CSRRP compares the confidence score of the CSRRP entry to a confidence threshold in step S120.

If the confidence score of the CSRRP entry exceeds the confidence threshold (step S120-YES), the CSRRP may determine that an RRE would occur upon execution of the fetched instruction, and thus the fetched instruction may be an RPS. If the confidence score of the CSRRP entry does not exceed the threshold (step S120-NO), the CSRRP may determine that an RRE would not occur upon execution of the fetched instruction, and thus the fetched instruction is not an RPS.

Regardless of the confidence determination (step S120-NO or S120-YES), the CSRRP compares the sample state to the sampling threshold, which may be embodied as the sampling counter discussed above, to determine whether the fetched store instruction should be sampled, in steps S125 and S140. The CSRRP may sample the fetched store instruction to learn whether the store instruction would not have caused an RRE. Specifically, in the case in which the sampled instruction is marked as an RPS, the CSRRP performs sampling to determine that the sampled instruction, in fact, would not cause an RRE. Thereby, the sampling may be performed to correctly handle an instruction, set as an RPS, to be handled as an instruction that is not an RPS. In this respect, periodic sampling may train the CSRRP to more accurately predict whether a store instruction will generate an RRE when executed.

If it is determined that the instruction should not be sampled (step S125-NO), the CSRRP does not sample the fetched store instruction in step S130. Because the CSRRP has previously determined that the store instruction should not be set as an RPS, the store instruction is not set as an RPS in step S130.

If it is determined that the instruction should be sampled (step S125-YES), the CSRRP samples the fetched store instruction in step S135. Here, once the instruction has been sampled, the CSRRP may reset the sampling state of the CSRRP entry corresponding to the instruction based on the confidence score of the CSRRP entry, as illustrated in FIGS. 2A-B. Further, because the CSRRP has previously determined that the sampled store instruction should not be set as an RPS, the sampled store instruction is not set as an RPS in step S135.

If it is determined that the instruction should be sampled (step S140-YES), the CSRRP samples the fetched store instruction in step S150. Again, once the instruction has been sampled, the CSRRP may reset the sampling state of the CSRRP entry corresponding to the instruction based on the confidence score of the CSRRP entry, as illustrated in FIGS. 2A-B. Because the fetched store instruction is sampled, the CSRRP does not set the sampled store instruction as an RPS in step S150.

Only if it is determined that a fetched instruction is an RRP (step S120-YES) and should not be sampled (step S140-NO) is the fetched instruction marked as an RPS.

When the sampling state reaches the sampling threshold and sampling is performed in steps S135 and S150, the CSRRP resets the sampling state (i.e., sampling period) of the CSRRP entry based on the confidence score of the CSRRP entry, as discussed above.

FIG. 2A illustrates a table describing confidence states of a CSRRP entry and associated sampling periods. As confidence that an instruction will generate an RRE increases (i.e., as the confidence score increases), the less frequently sampling is required, and so the sample period increases (i.e., the frequency of sampling decreases). As confidence that an instruction will not generate an RRE increases (i.e., as the confidence score decreases), the sampling period decreases (i.e., the frequency of sampling increases), and thus the CSRRP entry may be de-allocated as soon as possible.

FIG. 2A illustrates that the sampling state for samples having low confidence scores 1, 0, −1, . . . , and −6 may be reset to a short sampling period. Accordingly, CSRRP entries having such low confidence scores may be quickly marked for replacement.

FIG. 2B illustrates another table describing confidence states of a CSRRP entry and associated sampling periods. Whereas FIG. 2A illustrates samples having low confidence scores 1, 0, −1, . . . , and −6 may be reset to a short sampling period, FIG. 2B illustrates that the sampling period may be less aggressively reset (i.e., the frequency of sampling decreases) as confidence that an instruction will not generate an RRE increases (i.e., as the confidence score decreases). For example, samples having confidence scores of −2, −3, −4, −5, and −6 may be set for sampling at intervals of 4, 16, 64, 256, and 1024, respectively.

Returning to FIGS. 1A-B, once the store instruction is executed in Step S153, the CSRRP entry of the instruction indicates whether the instruction is set as an RPS and whether the instruction has been sampled.

When the fetched store instruction is executed (step S153), the CSRRP checks whether an RRE occurred in step S155.

If the CSRRP determines that an RRE did not occur (step S155-NO), the CSRRP determines whether the instruction was a sampled store instruction in step S160 based on the corresponding CSRRP entry, as discussed above.

If the CSRRP determines that the instruction was not a sampled store instruction, then no RRP update is required in step S165.

On the other hand, if the CSRRP determines that the instruction was a sampled store instruction, then the CSRRP determines whether the confidence state has reached the replacement threshold, which has been discussed above, in step S170.

If the CSRRP determines that the confidence state has not reached the replacement threshold (step S170-NO), the confidence state is decremented, in accordance with the exemplary embodiment.

As noted above, however, the confidence state indicates a likelihood that the CSRRP entry, which identifies the memory address of the instruction generating an RRE, will accurately predict that the instruction stored at the associated memory address will generate the RRE if the instruction is executed. Accordingly, the direction of the confidence state (either incrementing or decrementing) may be arbitrarily set to indicate the increasing likelihood. Therefore, according to an alternative embodiment, the confidence score may be incremented. Regardless of the direction, updating of the confidence state by the CSRRP indicates an increasing certainty that the currently executed instruction would not cause an RRE, in step S170-NO.

If the CSRRP determines that the confidence state has reached the replacement threshold (step S170-YES), the CSRRP entry is marked for replacement in step S180.

Accordingly, when the CSRRP entry table is full of valid CSRRP entries, and a new CSRRP entry needs to be allocated, a last CSRRP entry (or alternatively any CSRRP entry) marked for replacement is deallocated to make room for the new CSRRP entry. Alternatively, the CSRRP entry may simply be immediately deallocated upon the confidence state reaching the replacement threshold.

If the CSRRP determines that an RRE did occur as a result of the instruction execution (step S155-YES), the CSRRP determines whether a corresponding CSRRP entry exists for the instruction in step S185. Here, if a corresponding CSRRP entry does not exist (step S110-NO and step S185-NO), a new CSRRP entry is allocated for the instruction.

If the CSRRP determines a CSRRP entry exists for the executed instruction (step S185-YES), the CSRRP updates the confidence score of the CSRRP entry for the executed instruction in step S195. For example, the confidence score may be incremented. Such updating of the confidence state by the CSRRP indicates an increasing certainty that the currently executed instruction would cause an RRE.

Architectural performance modeling shows that the CSRRP scheme illustrated in FIGS. 1A-B recovered performance losses induced by a conventional RRP due to NCL penalties. For a set of industry-standard workloads that exhibited greater than 10% performance loss with a conventional RRP, the average performance loss was 14%. The CSRRP scheme of the present disclosure lost only 2.18% performance across those workloads.

At the same time, the CSRRP still showed similar performance gains on workloads that benefit from an RRP scheme. On a set of industry-standard workloads which benefitted more than 10% by an RRP, the average performance gain was 26%, which was the same performance gain by the CSRRP of the present disclosure.

The exact confidence state that a newly allocated entry obtains and the amount that the confidence state is incremented and decremented may be configured specifically to each processor based on the operating characteristics of the processor.

Similarly, the sampling periods for each confidence state may be altered and tuned to a specific processor's operating characteristics.

Figure 3:
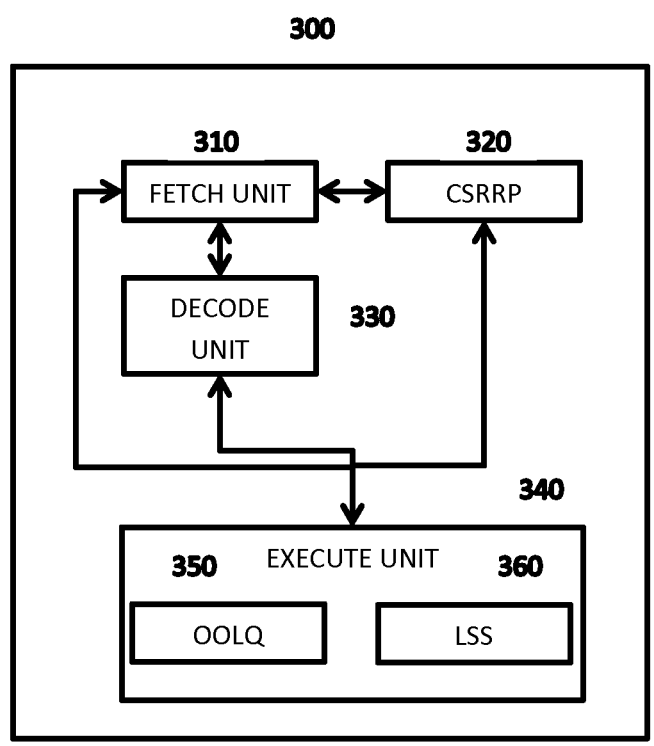
FIG. 3 illustrates a block diagram of a processor implementing CSRRP, according to an exemplary embodiment.

FIG. 3 illustrates a block diagram of a processor implementing CSRRP, according to an exemplary embodiment.

The processor 300 includes a fetch unit 310, a CSRRP 320, a decode unit 330, and an execute unit 340. The execute unit may further include an Out-of-Order Load Queue (OOLQ) 350 and a Load-Store Scheduler (LSS) 360.

The fetch unit 310 fetches instructions, for example a store instruction, from memory, based on the memory address of the instruction. The fetch unit may transmit the fetched instruction to the CSRRP 320 and decode unit 330 of the processor.

The CSRRP 320 performs RAW resynchronization prediction, as discussed above with respect to FIGS. 1A-B.

The decode unit 330 receives the instructions fetched by the fetch unit 310, and decodes the instructions for scheduling by the LSS 360 of the execute unit 340. The decode unit 330 transmits the decoded instructions to the execute unit 340.

The execute unit 340 receives the decoded instructions from the decode unit 340 and executes the instructions. The LSS 360 of the execute unit 340 may store all in-flight load and store instructions that have not yet been executed. The LSS 360 is responsible for picking the oldest possible load or store instruction that is ready to be picked. A load instruction or a store instruction is determined to be ready to be picked when the memory address of the instruction is calculated.

Because calculating memory addresses for different load instructions or store instructions takes a variable amount of time, younger load instructions or store instructions can be ready to be picked before older load instructions or store instructions, and therefore may be picked out of program order.

The OOLQ 350 in the execute unit 340 will store all load instructions that were executed ahead of an older store instruction. A load instruction will allocate into the OOLQ 350 when picked to execute by the LSS 360 and will deallocate when that load instruction is the oldest instruction in the pipeline.

When store instructions are picked for execution by the LSS 360, the OOLQ 350 checks all entries in the OOLQ 350 to determine whether there is an instruction address match. If there is an instruction address match, the OOLQ 350 compares ages of the instruction to determine whether the store instruction is older than the load instruction. If a store instruction is determined to correspond to a younger load instruction with a matching address, the store instruction is marked as generating an RRE.

The execute unit 340 updates the CSRRP 320 by transmitting to the CSRRP 320 the instruction address of the store instruction that triggered the RRE. Accordingly, a CSRRP entry for that instruction may be allocated in the CSRRP 320, as discussed above. This CSRRP entry for the instruction may then be used later for matching against fetched instruction addresses, as also discussed above.

If the RRE-marked store instruction is the oldest instruction in the pipeline, the OOLQ 350 flushes all in-flight instructions in the pipeline and indicates to the fetch unit 310 to start fetching the next instruction in program order.

As a result, when an instruction address is produced by the fetch unit 310 that matches an address in a CSRRP entry of the CSRRP 320, the instruction is marked as an RPS. When the RPS marked instruction is transmitted from the fetch unit 310 and decode unit 330 to the LSS 360 in the execute unit 340, the RPS indictor signals to not allow any younger load instructions to execute ahead of the RPS indicated instruction. This prevents the possibility of a costly RRE occurring.

The functions of the exemplary embodiments may be embodied as computer-readable codes in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves such as those used in Internet transmission. In addition, the computer-readable recording medium may be distributed to computer systems over a network, in which computer-readable codes may be stored and executed in a distributed manner.

As will also be understood by the skilled artisan, the exemplary embodiments may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor comprising:
a Confidence/Sampling Read-After-Write Resynchronization Predictor (CSRRP) configured to receive an address of an instruction to be executed, store a CSRRP entry comprising the address of the instruction and a confidence score that indicates whether executing the instruction as a resynchronization predicted store (RPS) will avoid a Read-After-Write (RAW) resynchronization exception (RRE) penalty, and determine whether to execute the instruction as the RPS based on the confidence score.

2. The processor according to claim 1, wherein the CSRRP is further configured to determine whether to execute the instruction as the RPS based on the confidence score by comparing the confidence score to a confidence threshold and determining to execute the instruction as the RPS based on a result of the comparing.

3. The processor according to claim 2, wherein the CSRRP entry further comprises a sampling state of the instruction that indicates whether to sample the instruction to determine that the instruction would cause an RRE.

4. The processor according to claim 3, wherein the CSRRP is further configured to determine whether to execute the instruction as the RPS based on the confidence score by determining whether to sample the instruction based on the sampling state, and determining to execute the instruction as the RPS in response to determining not to sample the instruction based on the sampling state.

5. The processor according to claim 4, wherein the CSRRP is further configured to reset the sampling state based on the confidence score, in response to sampling the instruction.

6. The processor according to claim 5, wherein the CSRRP is further configured to reset the sampling state to a high frequency sampling state based on the confidence score indicating that executing the instruction as an RPS will avoid the RRE penalty and reset the sampling state to a low frequency sampling state based on the confidence score indicating that executing the instruction as an RPS will not avoid the RAW RRE penalty.

7. The processor according to claim 1, wherein the CSRRP is further configured to determine whether to deallocate the CSRRP entry based on the confidence score.

8. The processor according to claim 7, wherein the CSRRP is further configured to determine whether to deallocate the CSRRP entry based on the confidence score by comparing the confidence score to a replacement threshold, and deallocate the CSRRP based on a result of the comparing.

9. The processor according to claim 8, wherein the CSRRP is further configured to deallocate the CSRRP entry by marking the CSRRP entry for replacement.

10. The processor according to claim 1, wherein the CSRRP is further configured to update the confidence score by increasing the confidence score to indicate a greater likelihood that executing the instruction as an RPS will avoid the RRE penalty, in response to execution of the instruction by the processor generating the RRE and by decreasing the confidence score to indicate a lesser likelihood that executing the instruction as an RPS will avoid the RRE penalty, in response to execution of the instruction by the processor not generating the RRE.

11. A method of predicting whether execution of an instruction as a resynchronization predicted store (RPS) by a processor will avoid a Read-After-Write (RAW) resynchronization exception (RRE) penalty, the method comprising:
receiving an address of an instruction to be executed;
storing a CSRRP entry comprising the address of the instruction and a confidence score that indicates whether executing the instruction as the RPS will avoid the RRE penalty; and
determining whether to execute the instruction as the RPS based on the confidence score.

12. The method of claim 11, wherein the determining comprises:
comparing the confidence score to a confidence threshold; and
determining to execute the instruction as the RPS based on a result of the comparing.

13. The method of claim 12, wherein the CSRRP entry further comprises a sampling state of the instruction that indicates whether to sample the instruction to determine that the instruction would cause an RRE.

14. The method of claim 13, wherein the determining whether to execute the instruction as the RPS based on the confidence score comprises:
determining whether to sample the instruction based on the sampling state; and
determining to execute the instruction as the RPS in response to determining not to sample the instruction based on the sampling state.

15. The method of claim 14, further comprising:
resetting the sampling state based on the confidence score, in response to sampling the instruction.

16. The method of claim 15, wherein the resetting comprises:
resetting the sampling state to a high frequency sampling state based on the confidence score indicating that executing the instruction as an RPS will avoid the RRE penalty; and
resetting the sampling state to a low frequency sampling state based on the confidence score indicating that executing the instruction as an RPS will not avoid the RRE penalty.

17. The method of claim 11, further comprising:
determining whether to deallocate the CSRRP entry based on the confidence score.

18. The method of claim 17, wherein the determining whether to deallocate the CSRRP entry comprises:
comparing the confidence score to a replacement threshold; and
deallocating the CSRRP based on a result of the comparing.

19. The method of claim 18, wherein the deallocating comprises:
marking the CSRRP entry for replacement.

20. The method of claim 11, further comprising:
updating the confidence score by increasing the confidence score to indicate a greater likelihood that executing the instruction as an RPS will avoid the RRE penalty, in response to execution of the instruction by the processor generating the RRE; and updating the confidence score by decreasing the confidence score to indicate a lesser likelihood that executing the instruction as an RPS will avoid the RRE penalty, in response to execution of the instruction by the processor not generating the RRE.

\* \* \* \* \*